Dec. 8, 1931. J. FREER Re. 18,273

EXERCISING DEVICE FOR ANIMALS

Original Filed Sept. 7, 1929

INVENTOR.
JAMES FREER-DECEASED.
BY NELLIE FREER-ASSIGNEE.
BY HER ATTORNEYS.

Williamson & Williamson

Reissued Dec. 8, 1931

Re. 18,273

UNITED STATES PATENT OFFICE

JAMES FREER, DECEASED, LATE OF WAYZATA, MINNESOTA, BY NELLIE FREER, OF WAYZATA, MINNESOTA, ASSIGNEE

EXERCISING DEVICE FOR ANIMALS

Original No. 1,794,951, dated March 3, 1931, Serial No. 391,033, filed September 7, 1929. Application for reissue filed April 20, 1931. Serial No. 531,651.

This invention relates to devices for exercising and amusing wild animals in captivity and is especially applicable to captive fur bearing animals of the type usually kept in relatively small pens.

In natural state, wild animals obtain a great amount of exercise in running, swimming, climbing and jumping. It is estimated by trappers and others who are familiar with the characteristics of wild animals that as small an animal as the mink will average from five to eight miles travel per day. Foxes, of course, often travel over one-hundred miles in a single day.

At the present time, a large number of so-called fur farms exist wherein the captive animals, such as mink, foxes, raccoons, rabbits and other fur bearing animals are kept in small pens often only three or four times the actual length of the animal. Under such conditions, it is usually impossible for the animal to get the requisite amount of exercise to maintain the proper condition of health. As a result, the fur and the pelts are greatly impaired and the sex tendencies and prolificness of the animals are greatly reduced.

I am, of course, familiar with the rotary tread cylinders or wheels often mounted in squirrel cages but extensive experiments have shown me that these are totally unsuited for most fur bearing animals, such as mink, raccoon, foxes and other species. In most cases, fur bearing animals will not utilize a device constructed in the manner of a squirrel wheel, partially because the wheel is bulky and is supported at both ends and partially because the entrance is considerably obstructed by standards, spiders or other means and the animal cannot clearly see the interior and is timid about entering. Further, in such wheels, there is a shearing action between the spider or entrance end of the wheel and the adjacent supports, which is dangerous and makes the animals reluctant to use the device. Moreover, the old squirrel wheel is bulky and is not adapted to be mounted in the small pens extensively used at this time.

It is an object of my invention to provide a simple, efficient and sanitary exercising device for wild animals in captivity which the animals will readily use and enjoy, thereby giving the healthful exercise which the animal would normally get in natural state.

It is a further object to provide a simple, efficient rotary exercising device for animals occupying little space, adapted to be readily installed in the pens now extensively used on fur farms and scientifically constructed to permit the animal to enter or leave without danger.

Another object is to provide a device of the class above described, which may be entirely supported from a single post or wall, which may be quickly and easily attached, and which will have the entire outer end opened and the interior exposed thereby immediately attracting the animal.

Still another object is to provide an animal exercising device which will withstand long continued usage without decreasing its efficiency and which will not require lubrication or other care of an attendant to insure proper operation.

Another object is to provide a rotary device of the class described, adjustable friction mechanism, whereby the ease by which the rotary tread member may be turned may be varied as desired according to the weight and other conditions of the particular animal for which intended.

These and other objects and advantages of the invention will be fully set forth in the following description made in connection with the accompanying drawings in which like reference characters refer to similar parts throughout the several views and in which:—

Figure 1:
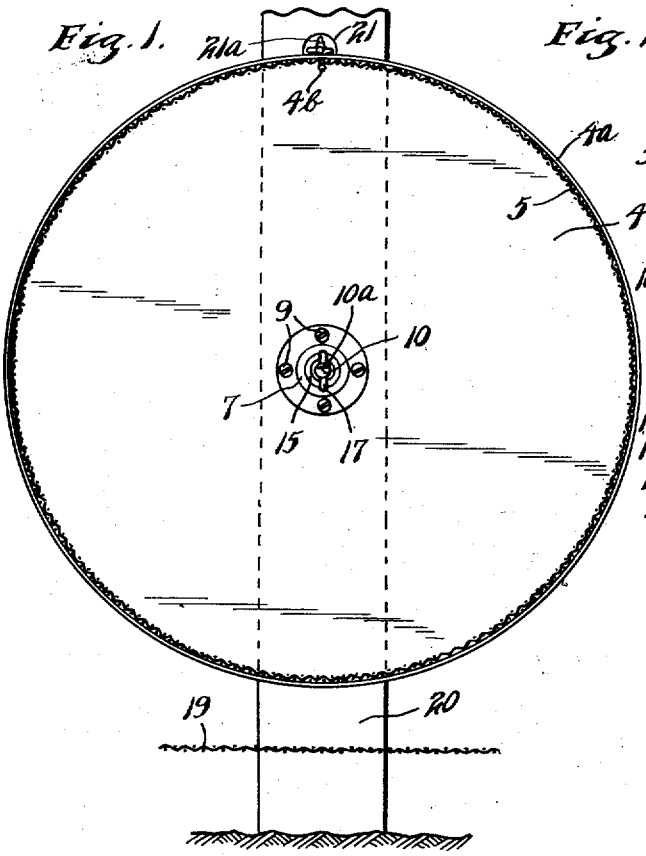
Fig. 1 is a front elevation showing my device in plan operatively mounted on a standard or frame member of an animal pen.

The preferred embodiment of my invention, as illustrated, comprises a freely rotatable tread wheel having a rear, preferably sheet metal, disc 4 of suitable diameter according to the size of the animal for which the device is intended. Disc 4 has an outturned flange 4*a* to which a relatively narrow tread cylinder 5 of substantially rigid wire netting is secured. The width of the tread portion cylinder 5 is slightly greater than the width of the animal for which it is intended. The outer end is entirely open and free from any cross pieces, spiders or other partial obstructions.

The wheel is entirely supported from its rear end or face and to this end I provide a sleeve or hub 6, which may be threadedly or otherwise secured to a socket plate 7 rigidly attached to the center of disc 4. As shown, the central portion of disc 4 is clamped between socket plate 7 and centrally apertured reinforcing disc 8 by means of small clamping bolts 9.

Hub 6 is rotatably mounted on a horizontal stub shaft 10, the inner or rearward end of which is suitably and rigidly secured to a socket plate or bracket 11 adapted for rigid attachment to an upright post, standard or wall of a pen.

It is desirable to provide efficient bearings for hub 6 which will withstand long continued usage and which further will not require lubrication or attention. As shown, bearings of the ball type are employed at the outer and inner ends of hub 6, ball races 22 being fitted into machined internal portions at the respective ends of hub 6, the outer and inner ball races being spaced apart by means of a spacing sleeve 12, which telescopes over stub shaft 10. Shaft 10 projects some distance beyond the outer end of hub 6, passing through a washer 13 which closes the end of said sleeve and is preferably provided with a longitudinal flat portion 10*a* by which friction washers may be non-rotatably secured to the projecting end of said shaft.

A friction washer 14 having a central aperture approximately the shape of the flattened end of shaft 10, is slipped on said shaft abutting the closed end of the wheel hub 6 and also abutting the washer 13. A second washer 15 is also mounted on the projecting end of shaft 10, spaced some distance from friction washer 14, and a short coil spring 16 is interposed between washers 14 and 15. A wing nut 17 engages the outer threaded extremity of shaft 10 and is adapted through spring 16 to place a pressure upon friction washer 14.

Figure 2:
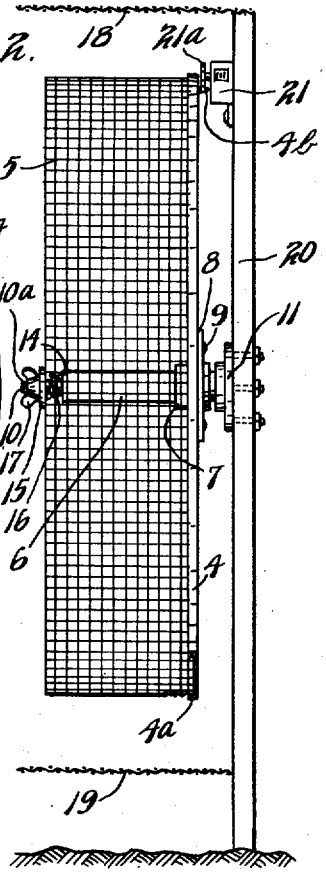
Fig. 2 is a side elevation of the same.

The numerals 18 and 19 in Figs. 1 and 2 indicate the top and bottom netting of a type of pen extensively used and one of the posts or upright frame members of the pen, to which the supporting bracket or socket plate 11 is secured, is indicated by the numeral 20.

To indicate the number of revolutions the tread wheel has traveled and consequently to indicate the mileage covered by the animal using the device, I provide a cyclometer 21, which may be attached to the post 20 or to a wall of the pen adjacent the inner surface of disc 4, which cylometer has the usual star wheel 21*a* adapted to be struck and turned by a small pin 4*b* projecting rearwardly from a point on disc 4.

The operation and advantages of my improved exercising device, while perhaps obvious from the foregoing description, may be briefly described as follows:—

The outer end of the tread wheel is open and free from obstruction and the animal can easily see the entire interior of the device. The animal will, therefore, have no hesitancy in entering the tread cylinder and in actual practice I have found that fur bearing animals, such as mink, will enter and utilize the wheel within a few minutes after a device has been installed in their pens. The animals at once discover that the wheel will rotate and tread the wheel, usually running on the tread portion, thereby engaging in relaxation and amusement as well as obtaining the requisite exercise.

Figure 3:
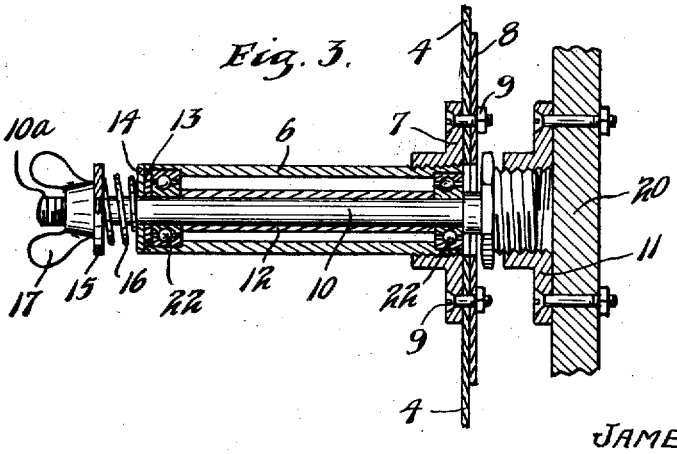
Fig. 3 is a detail cross section on a larger scale taken longitudinally through the hub of the tread wheel.

Since the wheel is entirely supported from its rear side no cross pieces, spider frames or standards are necessary at the front or entrance side of the wheel and there is, therefore, no shearing action between parts of the wheel and the standard to constitute a menace to the safety of animals utilizing the device. The foraminous construction of the tread member and the metal construction of the disc 4 provides a highly sanitary device, and permits droppings to pass through the tread member, as shown in Figs. 2 and 3. The hub 6 projects forwardly and outwardly from the disc 4 in the center of the wheel, but in no way can interfere with the travel of the animal or the use of the wheel.

If the wheel is to be utilized by a relatively heavy animal the friction mechanism is usually set to cause the wheel to tend to turn less easily, thereby furnishing an adjustable device which may be properly regulated as the young animals gain in weight and which may be utilized for animals of various species. The hub and its efficient pivotal mounting affords a construction which will withstand long continuous usage without impairment of the efficiency of the device and without requiring lubrication or attention to insure perfect operation.

I have used the device extensively at my fur farm in Wayzata, Minnesota, and have obtained remarkable results therefrom. My mink, which have used the device, have rich, lustrous fur and pelts of better quality than in the case of animals in the same pens where a device has not been provided. I find that the litters from pairs of fur bearing animals using my device are considerably larger, oftentimes 30 to 50% larger than in the case of animals on the same farm, in the same type pens where the exercising device has not been provided.

The cylindrical netting constituting the tread cylinder affords a good grip or traction for the animals in addition to providing the requisite sanitation and lightness of material.

It will, of course, be understood that various changes may be made in the form, details, arrangement and proportions of the parts without departing from the scope of applicant's invention.

What is claimed is:—

1. In an exercising device for animals, an annular tread member having an open entrance end, a member secured across the opposite end of said tread member, a hub secured to said last mentioned member concentrically of said tread member, said hub projecting within said tread member and having an end conveniently accessible from the open end of said tread member, a pivot member on which said hub is loosely mounted, means for supporting said pivot member from the rear of said tread member, a friction washer mounted on the forward end of said pivot member and adapted to engage the forward end of said hub member, and means for yieldingly applying pressure against said friction member.

2. An exercising device for animals comprising an annular tread member having one unobstructed open end, the opening in which is as large in internal diameter as the largest internal diameter of any part of said tread member, a closure applied to the other end of said tread member, and supporting means at the last mentioned end of said tread member and on which said closure is rotatably mounted for rotatably supporting said tread member only at its end opposite its unobstructed end.

In testimony whereof I affix my signature.

NELLIE FREER,
*Assignee of James Freer, Deceased.*